(12) United States Patent
Stephens et al.

(10) Patent No.: US 10,754,770 B2
(45) Date of Patent: Aug. 25, 2020

(54) WORK STEALING OF PARTIALLY-MARKED OBJECTS

(75) Inventors: Maoni Stephens, Sammamish, WA (US); Patrick Dussud, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1489 days.

(21) Appl. No.: 13/269,634

(22) Filed: Oct. 10, 2011

(65) Prior Publication Data
US 2013/0091186 A1    Apr. 11, 2013

(51) Int. Cl.
*G06F 12/02* (2006.01)

(52) U.S. Cl.
CPC .................. *G06F 12/0253* (2013.01)

(58) Field of Classification Search
USPC .......................................................... 707/813
See application file for complete search history.

(56) References Cited

U.S. PATENT DOCUMENTS

| | | | | |
|---|---|---|---|---|
| 6,826,583 | B1 * | 11/2004 | Flood | G06F 12/0269 |
| 7,092,978 | B2 * | 8/2006 | Garthwaite | |
| 7,428,560 | B1 | 9/2008 | Detlefs et al. | |
| 7,640,544 | B2 | 12/2009 | Flood et al. | |
| 2009/0248766 | A1 * | 10/2009 | Garthwaite et al. | 707/206 |
| 2009/0327372 | A1 * | 12/2009 | Ylonen | G06F 12/0253 |
| 2010/0211753 | A1 | 8/2010 | Ylonen | |
| 2013/0125133 | A1 * | 5/2013 | Schuster | 718/105 |

OTHER PUBLICATIONS

Endo, et al., "A Scalable Mark-Sweep Garbage Collector on Large-Scale Shared-Memory Machines", Retrieved at <<http://ieeexplore.ieee.org/stamp/stamp.jsp?tp=&arnumber=1592629>>, Proceedings of the ACM/IEEE conference on Supercomputing (CDROM), Nov. 15-21, 1997, pp. 14.

Detlefs, et al., "GarbageFirst Garbage Collection", Retrieved at <<http://www.google.co.in/url?sa=t&source=web&cd=1&ved=0CBcQFjAA&url=http%3A%2F%2Fciteseerx.ist.psu.edu%2Fviewdoc%2Fdownload%3Fdoi%3D10.1.1.63.6386%26rep%3Drep1%26type%3Dpdf&ei=nQwcTsPfGs_jmAWy9oz1Bw&usg=AFQjCNFumDknXeOYW1e9yzUpsNCxN3H3oQ>>, Proceedings of the 4th international symposium on Memory management, Oct. 24-25, 2004, pp. 12.

Wu, et al., "Task-pushing: a Scalable Parallel GC Marking Algorithm without Synchronization Operations", Retrieved at <<http://ieeexplore.ieee.org/stamp/stamp.jsp?arnumber=04228045>>, IEEE International Parallel and Distributed Processing Symposium, Mar. 26-30, 2007, pp. 10.

Pizlo, et al., "STOPLESS: A Real-Time Garbage Collector for Multiprocessors", Retrieved at <<http://www.cs.technion.ac.il/~erez/Papers/stopless.pdf>>, Proceedings of the 6th international symposium on Memory management, Oct. 21-22, 2007, pp. 11.

* cited by examiner

*Primary Examiner* — Boris Gorney
*Assistant Examiner* — Griselle C Roland (57) ABSTRACT

A process may utilize multiple garbage collector threads, each having the capability to steal partially-marked object references from an accessible mark stack having additional work that has yet to be processed. A partially-marked object reference may be represented as a pair of entries on a mark stack. A garbage collector thread may utilize an atomic operation to access the pair of entries in a prescribed manner to steal an unprocessed partially-marked object reference. In this manner, the workload of an overloaded garbage collector thread is offloaded to another garbage collector thread that may be idle thereby balancing the workload more evenly among multiple garbage collector threads.

20 Claims, 8 Drawing Sheets

WORK STEALING OF PARTIALLY-MARKED OBJECTS

BACKGROUND

Heap storage is a set of memory locations that are used by objects that are dynamically allocated during the execution of a program. A heap is managed by maintaining a list of the free memory locations within the heap. As the program executes, heap storage is allocated from the pool of free memory space and released either explicitly by the program or implicitly when the memory locations are no longer used. When the heap storage is released explicitly, the memory locations are added to a pool of free memory space.

Garbage is often used to describe the allocated heap storage that is no longer accessed by the program. Garbage collection is the process of reclaiming the memory locations that are no longer accessed by the program. A garbage collector typically marks the memory locations that are still being used and then reclaims the unmarked portions which are added to the pool of free memory space. Garbage collection adds a considerable overhead to a program since the garbage collector has to keep track of the objects that are referenced and then has to release the unreferenced objects on the fly. Techniques that minimize the computational overhead of a garbage collector are essential to sustaining the performance of a program.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a process with multiple garbage collector threads, a mark stack may be used to store partially-marked objects that have yet to be processed by a garbage collector thread. The mark stack of one thread may be overloaded with unprocessed objects while other garbage collector threads are idle. In order to more evenly balance the work load of each of the garbage collector threads, a mechanism is provided that allows each garbage collector thread to remove partially-marked objects from any mark stack in the process concurrently.

In a first embodiment, a garbage collector thread traverses a mark stack for two consecutive entries that are paired to form a partially-marked object. A first entry represents a parent object reference and the second entry represents a child object reference. The pair of consecutive entries is read and their values are stored. A garbage collector thread may steal the partially-marked object by using an atomic compare and swap operation to read a current value of the second entry. If the second entry matches a stored value, then the atomic compare and swap operation replaces the second entry with a stolen value thereby indicating that the partially-marked object has been stolen by another garbage collector thread.

In a second embodiment, a garbage collector thread traverses the mark stack for two consecutive entries that are paired to form a partially-marked object. If the address of the child object reference lies within the address range of the parent object reference, then an atomic compare and swap operation may be used to compare a current value of the second entry with a stored value. If the current value of the second entry matches the stored second value then, then the atomic compare and swap operation replaces the second entry with a stolen value thereby indicating that the partially-marked object has been stolen by another garbage collector thread.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to embodiments for work stealing of partially-marked objects from a mark stack during garbage collection. In a process having multiple garbage collector threads that execute in parallel, each garbage collector thread may have a dedicated mark stack which is accessible by other garbage collector threads within a process. A mark stack may contain references to objects that have yet to be traced and, in particular, partially-marked objects. In order to balance the work load of each of the garbage collector threads, a mechanism is provided that enables any garbage collector thread to remove a partially-marked object from any mark stack concurrently. In this manner, the work load of the garbage collector threads is more evenly balanced while avoiding redundant processing of the same partially-marked object by multiple garbage collector threads.

Garbage collection is a process that reclaims memory space consumed by objects that are no longer used by marking the objects which are still used by a program. A garbage collector thread may utilize a root set which lists references to objects allocated during runtime. The garbage collector thread traverses each object reference to determine whether an object is reachable from the root set. An object is reachable when there is a path from the root set to the object. When such a path exists, the garbage collector thread marks the object as being live. One way of marking an object may be to use a mark bit in the object's header. However, the garbage collector may choose other ways to indicate that an object is marked. The garbage collector thread may be set indicating that the object is reachable or live. Objects that are not reachable from the root set are considered garbage and not marked.

An object may contain a large amount of references to other objects and these objects may in turn contain references to yet other objects. As the garbage collector thread traverses the object references in the root set, a mark stack may be used to hold the references that have yet to be processed or marked. The mark stack may be limited in size or limited in the amount that the mark stack can grow. In order to avoid overflows of the mark stack, a group of objects may be placed onto the mark stack in the form of a partially-marked object. A partially-marked object is an object having references that were not placed onto the mark stack all at once.

Two or more garbage collector threads operate simultaneously and in parallel with other programs running in the process. A process may be configured with a garbage collector procedure that has multiple garbage collector threads. Each garbage collector thread may maintain a dedicated heap. However, the amount of objects that a garbage collector thread may need to mark may be unevenly balanced leaving one garbage collector thread idle while another garbage collector thread may be overloaded.

In this case, the idle garbage collector threads may steal work from other mark stacks thereby balancing the workload more evenly amongst all the garbage collector threads in a process. In this manner, the processing time of an overloaded garbage collector thread is minimized thereby reducing its impact on the performance of the executing program. However, stealing a partially-marked object needs to be coordinated in a precise manner in order to avoid two garbage collector threads from stealing the same partially-marked object concurrently. Attention now turns to a more detailed description of the system for work stealing of partially-marked objects.

Figure 1:
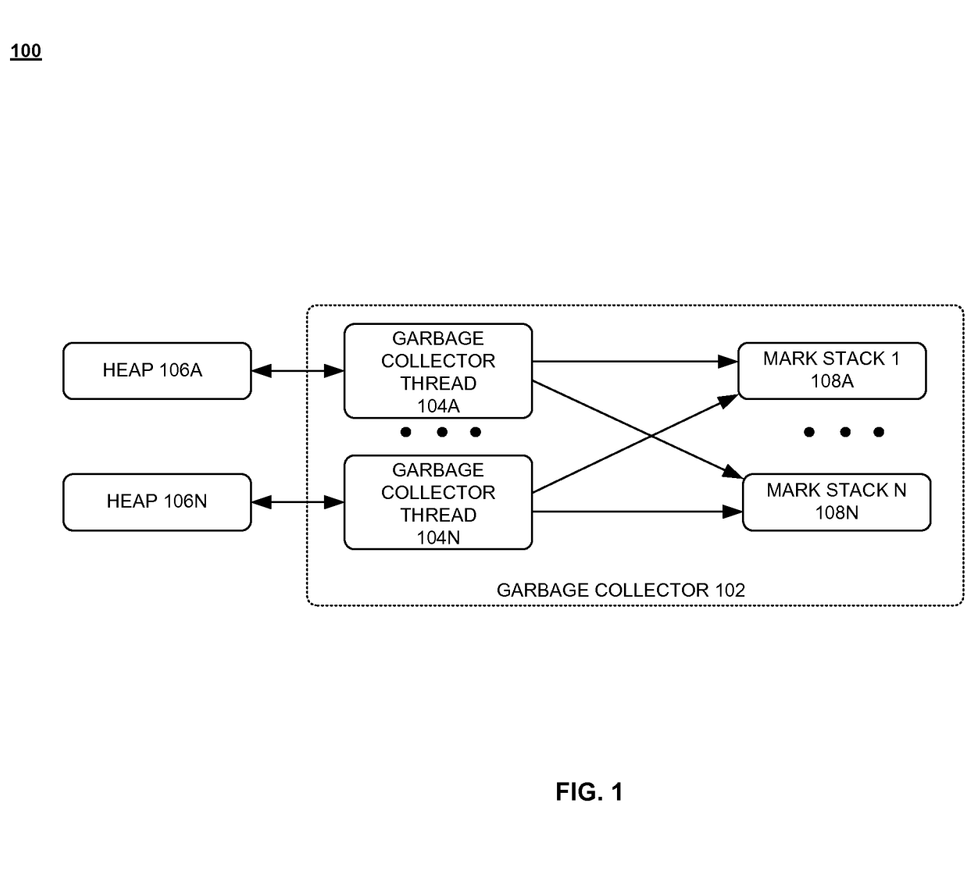
FIG. 1 illustrates a block diagram of an exemplary system for work stealing of a partially-marked object.

FIG. 1 illustrates an exemplary process 100 having a garbage collection mechanism that facilitates concurrent work stealing of partially-marked objects. Although the system 100 shown in FIG. 1 has a limited number of elements in a certain configuration, it should be appreciated that the system 100 can include more or less elements in alternate configurations.

A process 100 may be an independent execution environment configured to execute a sequence of executable instructions, such as a module or assembly of code pertaining to an application, program, function, or other assemblage or programmable and executable code. A process 100 has its own resources, such as a dedicated memory space and a dedicated garbage collector 102. One or more threads may execute within a process 100. Each thread may utilize a heap to store objects that are dynamically allocated at runtime. The garbage collector 102 maintains the heap by reclaiming memory locations that are no longer used by the process.

Referring to FIG. 1, there is shown a process 100 having a garbage collector 102 and a set of heaps 106A-106N (collectively, '106'). The garbage collector 102 may contain multiple threads of executions, referred to as garbage collector threads 104A-104N (collectively, '104') and multiple mark stacks, 108A-108N (collectively, '108'). A garbage collector thread 104 is a separate thread of execution within an application, program, function or other assemblage of programmable and executable code. Threads enable multiple paths or streams of execution of modules of executable instructions to occur concurrently within the same application. Each garbage collector thread 104 is configured to execute on a separate processor concurrently and in a multiprocessor environment that has more than one processor. Each garbage collector thread 104 may be used to reclaim memory locations associated with a particular heap 106. The heap 106 may be part of system memory.

A mark stack 108 may be a data structure used by a garbage collector thread 104 to store references that have yet to be marked. The mark stack 108 may be operated in a last-in-first-out manner. An item is added to the mark stack 108 by pushing the item onto the top of the mark stack 108. An item is removed from the mark stack 108 by popping off the item located on the top of the mark stack 108. In this manner, the last item added to the mark stack 108 is the first item out of the mark stack 108. The mark stack 108 is limited in size and when the mark stack 108 is out of space, the mark stack 108 is considered to be in an overflow state. When the mark stack 108 is in overflow state, the garbage collector thread 104 may not be able to continue operating in an efficient manner. Therefore, it is important for the mark stack 108 to avoid being in or close to the overflow state.

Each garbage collector thread 104 may place object references onto the mark stack 108 local to it and remove object references from other mark stacks within the same process. The mark stacks reside in a shared memory space that is accessible by each of the garbage collector threads within a process.

In one or more embodiments, a garbage collector 102 may be responsible for reclaiming objects in multiple processes where each process may steal work from other processes via an interprocess communication (IPC) mechanism that may consist of messages, sockets, a remote procedure call, shared memory, and so forth.

A process 100 may be implemented in a computer-implemented system having multiple components, programs, procedures, modules. As used herein these terms are intended to refer to a computer-related entity, comprising either hardware, a combination of hardware and software, or software. For example, an element shown in FIG. 1 may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Figure 2:
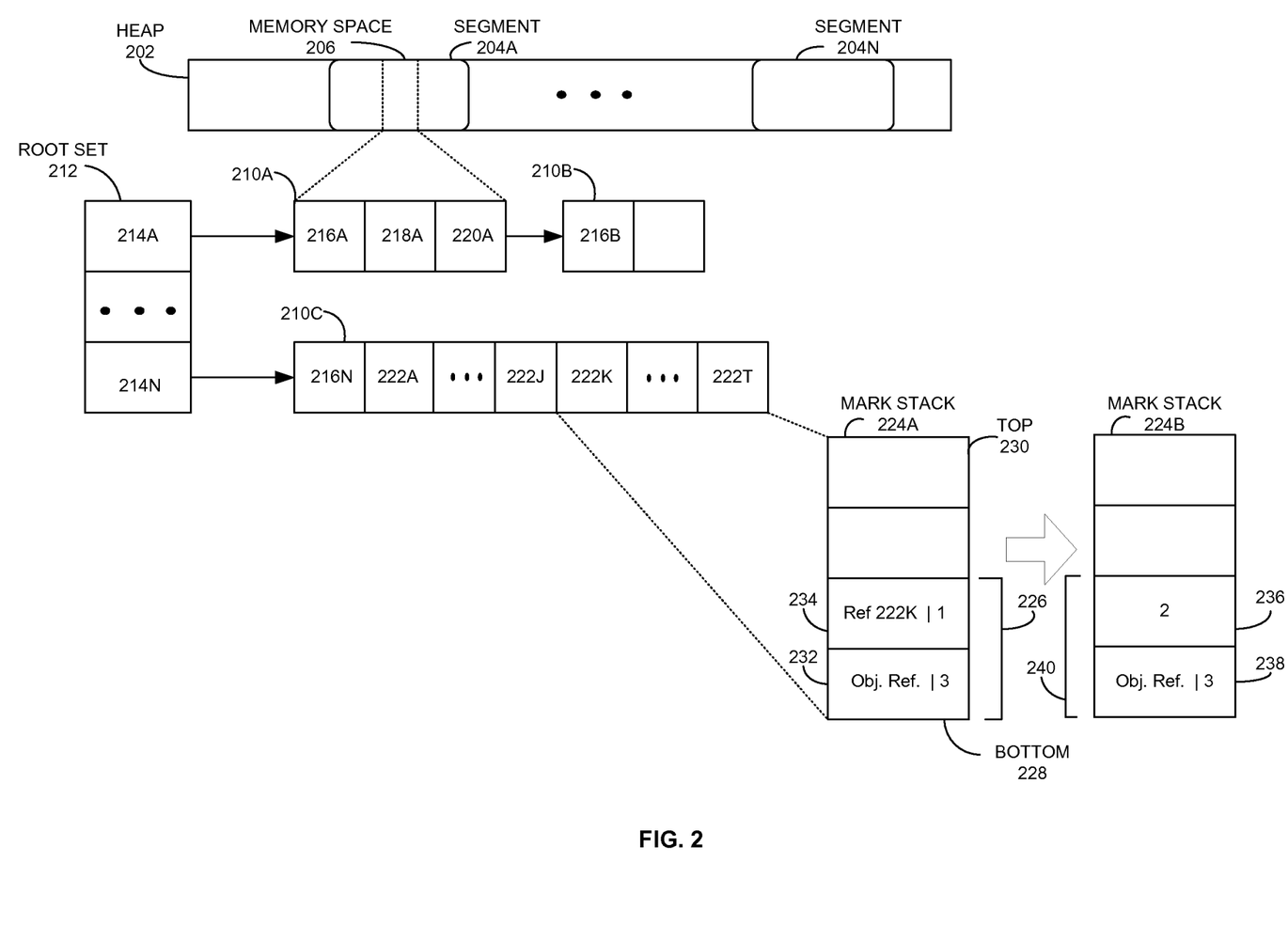
FIG. 2 illustrates an exemplary garbage collection process.

FIG. 2 illustrates a heap 202 that is used to store dynamically-created objects. The heap 202 may be partitioned into segments 204A-204N (collectively, '204') that may be allocated by an operating system. A segment 204 may be used to store objects in a memory space 206 designated to a particular program running under the operating system. Each segment 204 may contain one or more objects. An object may contain an object header, a data element, and/or references to other objects. The object header may include information about the object, such as a mark bit, the size of the object, and so forth. The data element may be a data value associated with an object, such as an integer, Boolean value, floating point number, string, character, and so on. For example, memory space 206 may contain object 210A. Object 210A has an object header 216A, data element 218A, and a reference to object 210B. Object 210B has an object header 216B.

A root set 212 includes references to objects that are currently being used. As shown in FIG. 2, root set 212 includes a reference 214A to object 210A and a reference 214N to object 210C. Object 210C contains an object header 216N and an array of T object references 222A-222T. A garbage collector thread 104 may process less than all of the T object references thereby storing the unprocessed object references onto a mark stack 224A. In an embodiment, there may be a predetermined threshold that specifies the number of object references that may be placed onto the mark stack 224A in a single entry at a given time. The use of the predetermined threshold reduces the likelihood of the mark stack 224A overflowing. For example, the predetermined threshold may be ten which indicates that a maximum of ten object references may be placed onto the mark stack for a given object as a single entry into the mark stack. This type of entry is considered a partially-marked object since the mark stack only contains a portion of the objects that have not been marked.

A mark stack 224A has a top 230 and a bottom 228. Entries are pushed onto the mark stack 224A towards the bottom 228 and entries are popped off from the top 230 in a last-in-first-out order. A partially-marked object is stored onto the mark stack 224A as a pair of entries 226. The first entry 232 is a parent object reference which is an address to the parent object. The second entry 234 is a child object reference which is an address to the next object reference that has yet to be marked. As shown in FIG. 2, the first entry 232 contains the parent object reference ORed with '3' (i.e., Obj. Ref. |3). ORing the parent object reference with the numeric value of '3' indicates that the value of the entry 232 is different than an ordinary object address. An OR operation is a logical OR function that is performed on the bits of the address contained in an entry with the bits of a numeric value.

For example, in some embodiments, ORing the parent object reference with an odd number is done because ordinary references to real object addresses are even numbers. The use of an odd numbered address may be used as an indication that a reference and a pointer are being used. In other embodiments, the last two bits in the address of the entry may be configured to be ORed with any value that results in generating an address that is different from an ordinary object address.

The child object reference 234 specifies the next object reference that has yet to be marked. In particular, the child object reference 234 specifies a set of object references beginning at the address contained in the child object reference 234. The child object reference 234 may be an address ORed with the numeric value '1'. For example, as shown in FIG. 2, the pointer 234 is the address of object 222K ORed with '1' since this is the next object reference that is to be processed and hence, stealable.

When a partially-marked object 226 is stolen by a garbage collector thread 104, the entries in the mark stack are altered as shown in mark stack 224B. The parent object reference 238 is left unchanged and the pointer entry 236 is replaced with the numeric value of '2'. Attention now turns to a discussion of how a partially-marked object is placed onto a mark stack atomically.

It should be noted that the formation of the heap, mark stack, and the root set is shown in a certain configuration, the embodiments are not constrained to this configuration and that other configurations may be utilized. In particular, the values used in the mark stack are exemplary and the embodiments are not limited in this manner.

Attention now turns to a more detailed discussion of the operation of a process with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
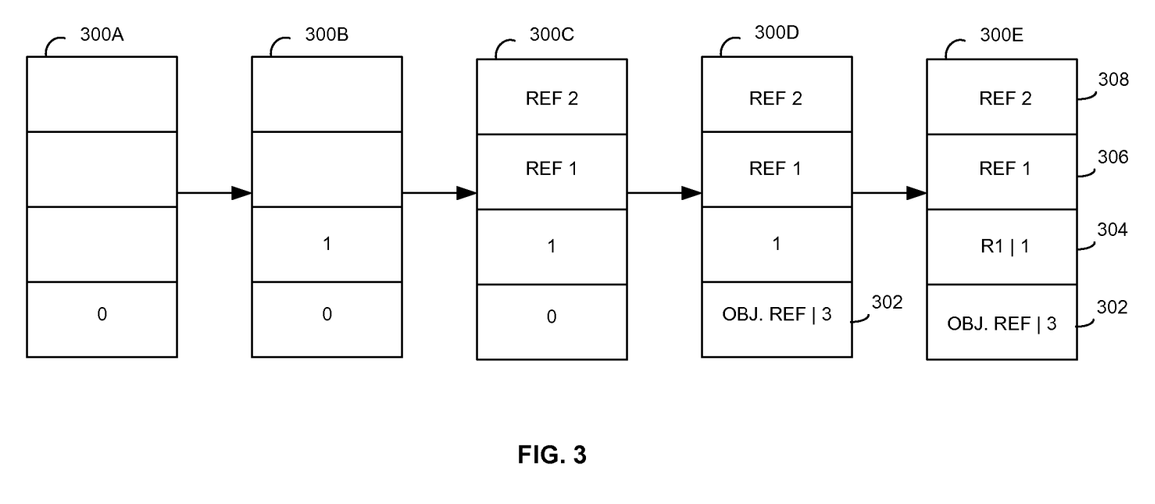
FIG. 3 illustrates an exemplary method of placing a partially-marked object onto a mark stack.

FIG. 3 is an exemplary method illustrating how a partially-marked object may be placed onto a mark stack in a manner that considers that the mark stack may be accessible by multiple garbage collector threads concurrently. When a garbage collector thread 104 encounters an object that may be partially marked, the garbage collector thread 104 pushes a '0' onto a mark stack 300A followed by pushing a '1' onto the mark stack 300A immediately thereafter. The '0' is a place holder for the garbage collector thread 104 to place the parent object reference and the '1' is a place holder for the garbage collector thread 104 to place the remaining work which is represented by a child object reference. Other child object references may be placed onto the mark stack thereafter, such as the child object references REF 1 and REF 2. However, the place holders are needed in the case the mark stack is close to overflowing and for the event that the garbage collector thread 104 may not finish processing all the object references.

A partially-marked object reference is implemented as a pair of entries, 302, 304. The first entry 302 is made by replacing the '0' value with the address of an object reference ORed with the numeric value '3' (i.e., OBJ REF | 3). The second entry 304 is made by replacing the '1' value with the address of the object reference ORed with the numeric value '1.' The resulting mark stack 300E contains a partially-marked object in entries 302, 304 and the child object references that are about to be marked as entries 306, 308.

It should be noted that the numeric values used to replace an object reference on the mark stack shown herein are used for illustration purposes and that the embodiments are not constrained to these particular values.

Figure 4:
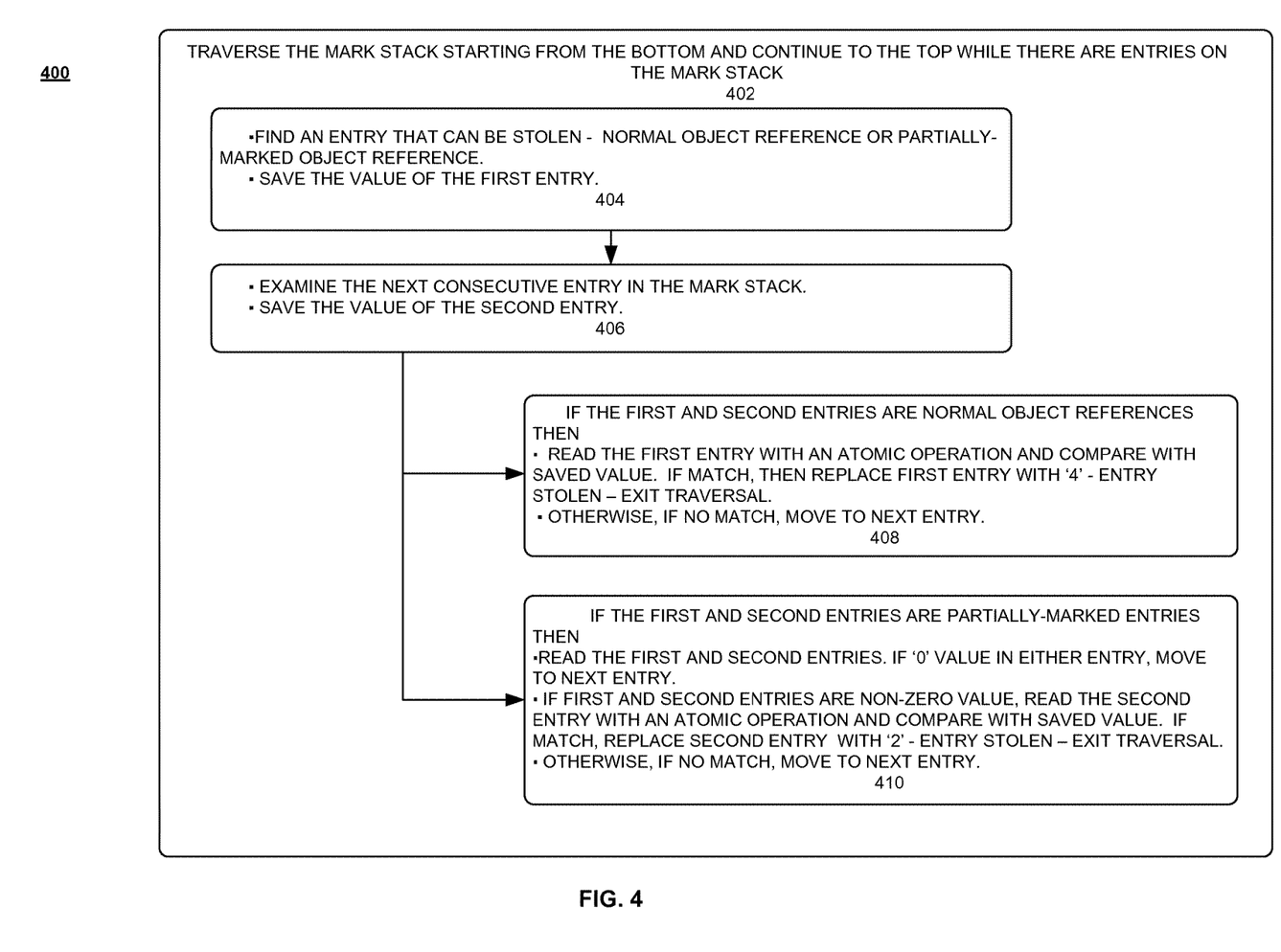
FIG. 4 illustrates a first exemplary method of removing a partially-marked object from a mark stack.

FIG. 4 is a flow diagram of a first exemplary method illustrating how a garbage collector thread steals a partially-marked object from a mark stack. A garbage collector thread may access the mark stack associated with another garbage collector thread in order to obtain object references to steal. Since the mark stack may be accessed by other garbage collector threads simultaneously, a garbage collector thread needs to follow a sequence of operations that ensures that the partially-marked object is removed from the mark stack atomically by only one garbage collector thread at a time.

Referring to FIG. 4, a garbage collector thread may traverse a mark stack starting from the bottom of the stack and examine each entry until the garbage collector thread reaches the top of the stack (block 402). The garbage collector thread examines each entry until the garbage collector thread finds the first entry that is stealable (block 404). A stealable entry is one that contains a normal object reference, otherwise referred to as a non-partially-marked object reference, or a partially-marked object reference (block 404). A normal object reference may contain an even-numbered address and a partially-marked object reference may contain an odd-numbered address.

When a stealable entry is found, the value of the first entry is read and stored (block 404). The next consecutive entry in the mark stack is read and the value of this second entry is stored (block 406). If the first and second entries are normal object references, then an atomic compare and swap operation may be used to read the first entry again in order to ensure that the object reference has not been removed or stolen by another garbage collector (block 408). The atomic compare and swap operation compares the current value of the first entry and to the stored value (block 408). If the current value of the first entry does not match the stored value of the first entry, then the normal object reference has been removed and the garbage collector thread continues to traverse the mark stack for the next entry (block 402).

Otherwise, if the current value of the first entry matches the previously stored value of the first entry, then the atomic compare and swap operation replaces the first entry with the numeric value '4' thereby stealing the non-partially-marked object (block 408). The numeric value '4' is selected only as an example to distinguish the entry from ordinary object references.

An atomic operation allows single access to a memory location at one point in time. An atomic operation may be implemented in software as a semaphore or in hardware through special instructions, such as a test-and-set instruction, compare-and-swap instruction, fetch-and-add instruction, and the like. A test-and-set instruction may be used to write a value to a memory location while returning its old value. A compare-and-swap instruction compares the contents of a memory location to a stored value and only if they are the same, alters the memory location to the swapped value. A fetch-and-add instruction atomically adds an increment to the contents of a memory location while returning the old value. Any type of atomic operation may be utilized in accessing the pair of entries representing a partially-marked object reference and the embodiments are not limited in this manner.

If the first and second entries are partially-marked object references, then the garbage collector thread reads the values in the first and second entries (block 410). If the first or second entry contains a numeric value of '0' (block 410), then the garbage collector thread proceeds to the next entry (block 402). If the first and second entries do not contain a numeric value of '0', then the garbage collector thread may use an atomic compare and swap operation to read the second entry to ensure that the partially-marked object reference has not been removed or stolen by another garbage collector thread (block 410). If the current value in the second entry is the same as the stored value, then the atomic compare and swap operation replaces the value in the second entry with a numeric value of '2', thereby stealing the child object reference (block 410). If the current value of the second entry does not match the previously stored value of the second entry (block 410), then the partially-marked object reference has been removed and the garbage collector continues to traverse the mark stack for the next entry (block 402).

Figure 5:
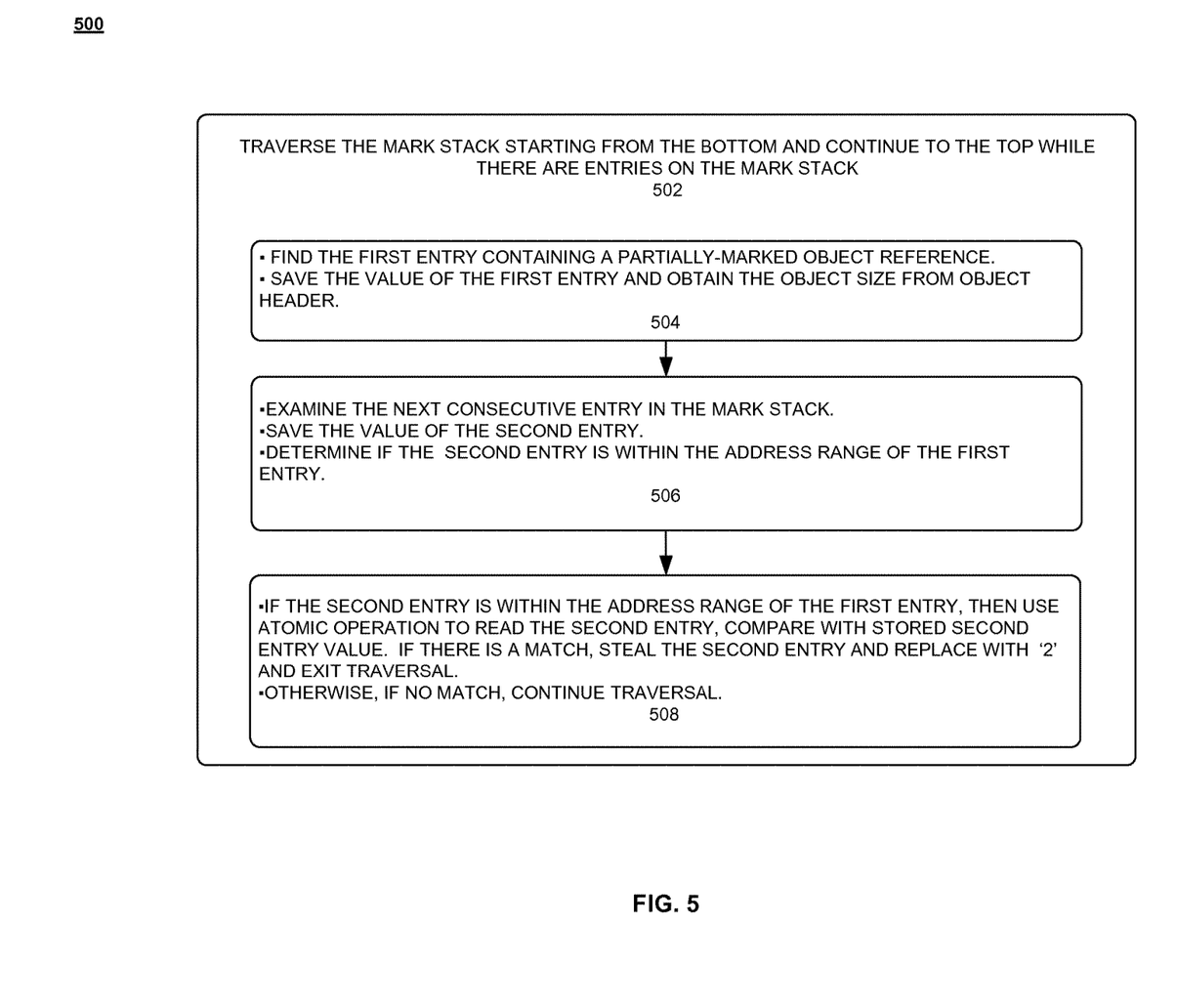
FIG. 5 illustrates a second exemplary method of removing a partially-marked object from a mark stack.

FIG. 5 is a flow diagram of a second exemplary method illustrating how a garbage collector thread steals a partially-marked object reference from a mark stack. In this embodiment, the garbage collector thread performs only one atomic operation on a partially-marked pair of entries in order to minimize the execution time of the garbage collector thread. When the garbage collector thread finds the first entry of a partially-marked object reference, or parent object reference, the garbage collector reads the second entry of the pair, or child object reference, and determines whether the child object reference address lies within the address range of the parent object reference. In this case, then an atomic compare and swap operation is used to steal the object reference. In this manner, only one atomic operation is performed thereby eliminating a computational expensive operation.

Referring to FIG. 5, a garbage collector thread may traverse a mark stack starting from the bottom of the stack and examine each entry until the garbage collector thread reaches the top of the mark stack (block 502). The garbage collector thread examines each entry until the garbage collector thread finds the first entry that contains a partially-marked object reference (block 504). A partially-marked object reference may be one that contains an odd-numbered address (block 504).

When a partially-marked object reference is found, the value of the first entry of the pair is read and stored (block 504). The garbage collector thread then reads the next entry in the mark stack to determine if it is the second entry of a partially-marked object reference pair (block 506). This may be determined by the value of the second entry being an odd-numbered address (block 506). If the next entry in the mark stack is not the second entry of a partially-marked object reference pair (block 506), then the garbage collector thread continues to traverse the mark stack (block 502).

If the next entry in the mark stack is the second entry of a partially-marked object reference pair, then the garbage collector thread finds the corresponding object and reads its object header (block 506). The object header contains information to compute the size of the object. The garbage collector thread then determines if the address of the second entry lies within the address range associated with the object referenced by the first entry. For example, the object header may indicate the size of an object and the object reference indicates the starting address of the address. From these two pieces of data, the garbage collector thread may compute the ending address associated with the object. If the address in the second entry lies within the address range specified by the starting and ending address of the object, then the garbage collector thread may determine that the second entry is a child object reference of the partially-marked object of the first entry (block 506).

If the address of the second entry does not lie within the address range of the object of the first entry (block 508), then the garbage collector thread continues to find the next partially-marked object reference (block 502). Otherwise, if the address of the second entry lies within the address range of the object of the first entry (block 506), the garbage collector thread attempts to steal the child object reference (block 508). The garbage collector thread may use an atomic compare and swap operation that reads a current value of the second entry to determine if it matches the stored value (block 508). If the current value of the second entry matches the stored value, then the atomic compare and swap operation replaces the second entry with a numeric value of '2' thereby stealing the child object reference (block 508). Otherwise, if the values do not match, then another garbage collector thread may have stolen the object, and the garbage collector thread continues to traverse the mark stack (block 502).

Figure 6:
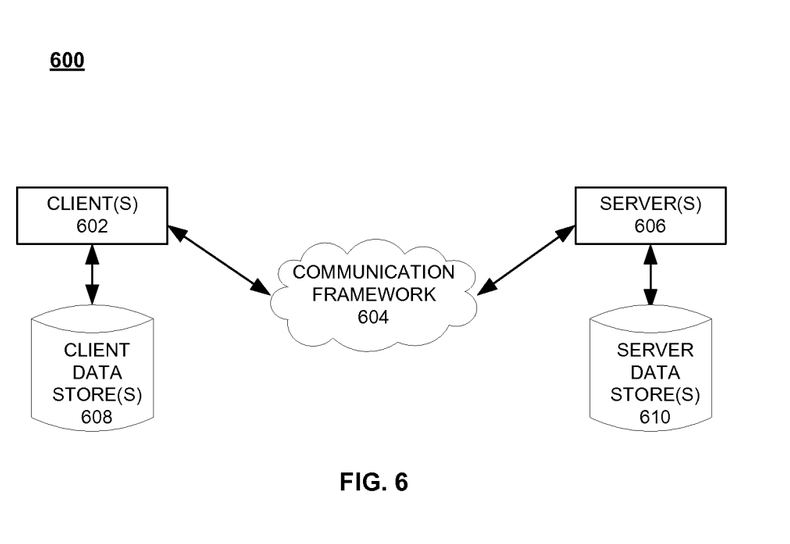
FIG. 6 is a block diagram illustrating a first operating environment.

Attention now turns to a discussion of an exemplary operating environment. FIG. 6 illustrates a first operating environment 600. It should be noted that the operating environment 600 is exemplary and is not intended to suggest any limitation as to the functionality of the embodiments. The embodiment may be applied to an operating environment 600 having one or more client(s) 602 in communication through a communications framework 604 with one or more server(s) 606. The operating environment 600 may be configured in a network environment, a distributed environment, a multiprocessor environment, or a stand-alone computing device having access to remote or local storage devices.

Each client(s) 602 is coupled to one or more client data store(s) 608 that store information local to the client 602. Each server(s) 606 is coupled to one or more server data store(s) 610 that store information local to the server 606. A client 602 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 602 may also be embodied as a software module having instructions that execute in a single execution path, multiple concurrent execution paths (e.g., thread, process, etc.), or in any other manner.

A server 606 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 606 may also be embodied as a software module having instructions that execute in a single execution path, multiple concurrent execution paths (e.g., thread, process, etc.), or in any other manner.

The communications framework 604 facilitates communications between the client 602 and the server 606. In an embodiment, the communications framework 604 may be embodied as a communications network, such as the Internet, a local area network, or a wide area network, or combinations thereof. The communications framework 604 may embody any type of communications medium, such as wired or wireless networks, utilizing any communication protocol.

Figure 7:
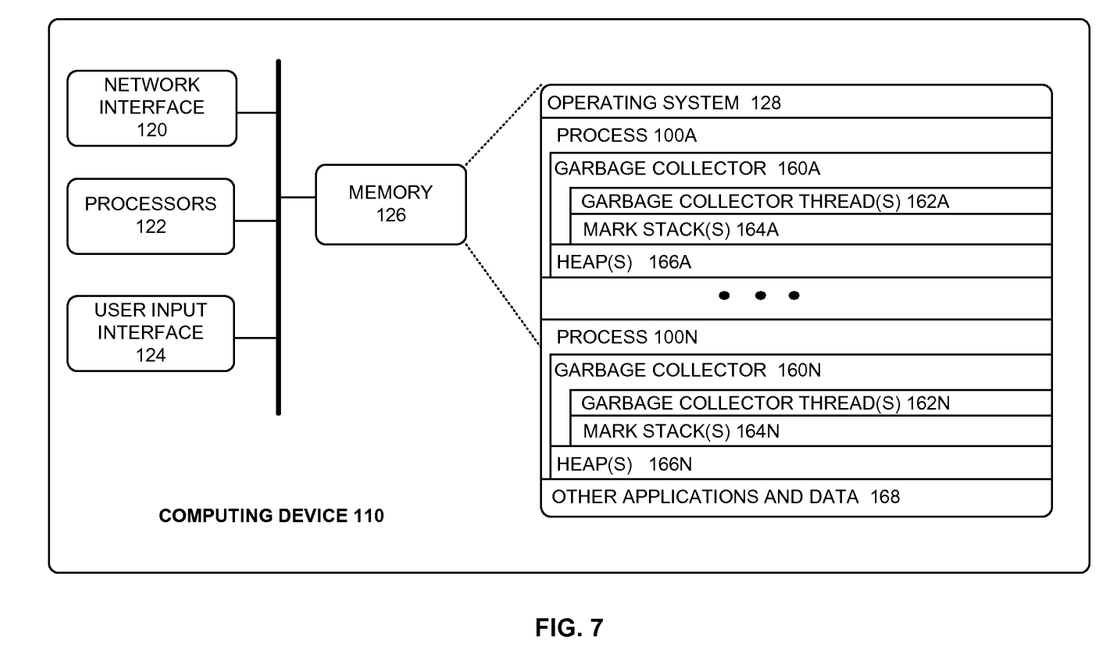
FIG. 7 is a block diagram illustrating a second operating environment.

FIG. 7 illustrates a second operating environment implemented as a multiprocessor computing device 110. It should be noted that the operating environment 700 is exemplary and is not intended to suggest any limitation as to the functionality of the embodiments. In this embodiment, the multiprocessor computing device 110 has one or more processes where each process has a garbage collector. The garbage collector threads are configured to steal partially-marked object references from any mark stack in that process.

The multiprocessor computing device 110 may have a network interface 120, two or more processors 122, a user input interface 124, and a memory 126. Each processor 122 may be any commercially available processor configured to operate in a multi-processor configuration. The network interface 120 facilitates wired or wireless communications between the computing device 110 and a communications framework.

The memory 126 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 126 may also include one or more external storage devices or remotely located storage devices. The memory 126 may contain instructions and data as follows:

an operating system 128;
    a process 100A having a garbage collector 160A and one or more heaps 166A, the garbage collector 160A having one or more garbage collector threads 162A and one or more mark stacks 164A;
    a process 100N having a garbage collector 160N and one or more heaps 166N, the garbage collector 160N having one or more garbage collector threads 162N and one or more mark stacks 164N; and
    various other applications and data 168.

Figure 8:
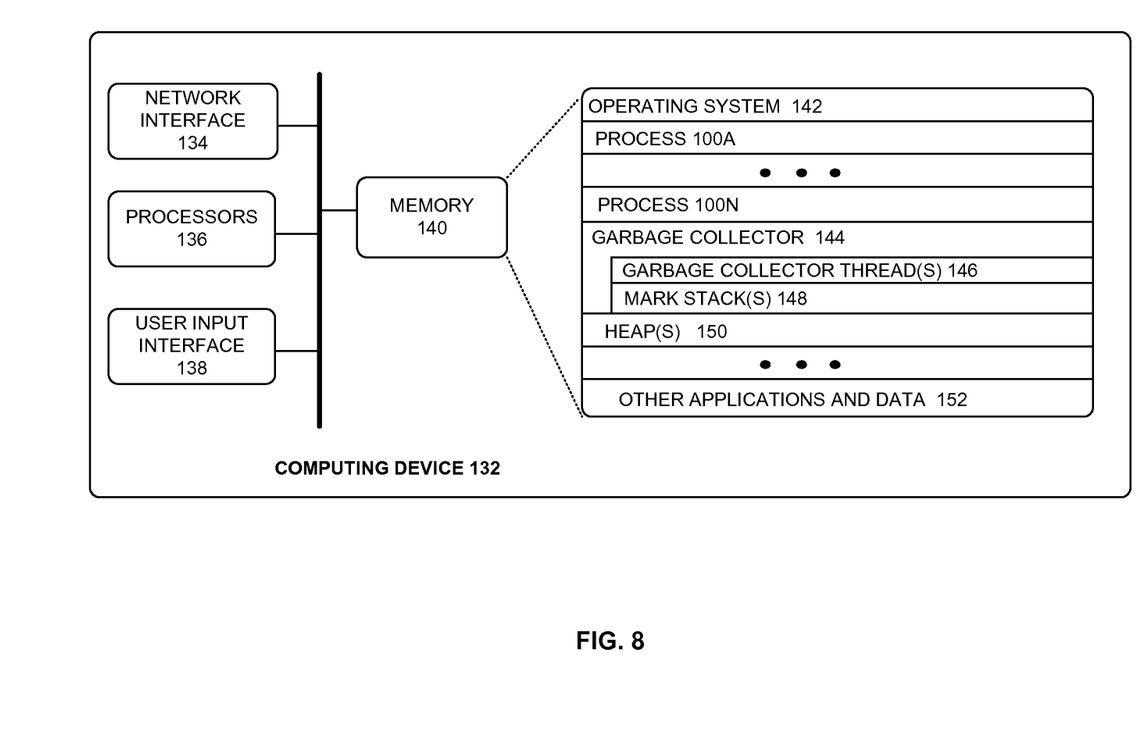
FIG. 8 is a block diagram illustrating a third operating environment.

FIG. 8 illustrates a third operating environment implemented as a multiprocessor computing device 132. It should be noted that the operating environment is exemplary and is not intended to suggest any limitation as to the functionality of the embodiments. In this embodiment, there are several processes executing on a multiprocessor computing device 110. However, the multiprocessor computing device 110 has a single garbage collector 102 and the garbage collector threads are configured to steal partially-marked object references from any mark stack.

The multiprocessor computing device 132 may have a network interface 134, two or more processors 136, a user input interface 138, and a memory 140. Each processor 136 may be any commercially available processor configured to operate in a multi-processor configuration. The network interface 134 facilitates wired or wireless communications between the computing device 132 and a communications framework.

The memory 140 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 140 may also include one or more external storage devices or remotely located storage devices. The memory 140 may contain instructions and data as follows:

an operating system 142;
    several processes, 100A-100N;
    a garbage collector 144 having one or more garbage collector threads 146 and one or more mark stacks 148;
    one or more heaps 150; and
    various other applications and data 152.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

What is claimed:

1. A computer-implemented method, comprising:
storing onto a mark stack, by a first garbage collector thread, a partially-marked object reference having a pair of consecutive entries in the mark stack, one entry of the pair representing a parent object and a second entry of the pair representing a child object reference, the mark stack accessible by multiple garbage collector threads concurrently, the child object reference comprises a location of a reference of the parent object that has not been marked;
searching the mark stack, by a second garbage collector thread, for a partially-marked object reference, the first garbage collector thread different from the second garbage collector thread; and
stealing from the mark stack, by the second garbage collector thread, the partially-marked object reference by replacing the child object reference with a stolen value.

2. The computer-implemented method of claim 1, further comprising:
marking, by the second garbage collector thread, objects referenced by the child object reference.

3. The computer-implemented method of claim 1, the searching step further comprising:
reading the mark stack for a first entry having a parent object reference;
reading the mark stack for a second entry having a child object reference; and
determining that the first entry and the second entry form a partially-marked object reference.

4. The computer-implemented method of claim 3, further comprising:
atomically replacing the second entry with a stolen value if the child object reference has not been stolen.

5. The computer-implemented method of claim 1, further comprising:
reading the mark stack for a first entry having a parent object reference;
reading the mark stack for a second entry having a child object reference; and
determining that the first and second entry form a partially-marked object reference when the child object reference is contained within an address range encompassed by the parent object reference.

6. The computer-implemented method of claim 5, further comprising:
atomically replacing the second entry with a stolen value if the child object reference has not been stolen.

7. The computer-implemented method of claim 1, further comprising:
pushing a first place holder onto the mark stack; and
pushing a second place holder onto the mark stack immediately after the first place holder.

8. The computer-implemented method of claim 7, further comprising:
replacing the first place holder with a parent object reference; and
replacing the second place holder with a child object reference.

9. A device,
comprising:
at least one processor and a memory;
the at least one processor configured to:
push a first entry onto a mark stack as a place holder for a parent object reference associated with a partially-marked object reference, the mark stack including references yet to be marked;
push a second entry onto a mark stack as a place holder for a child object reference that is associated with a parent object reference; and
replace the first entry with a parent object reference and the second entry with a child object reference that is associated with the parent object reference,
wherein the partially-marked object reference includes a pair of consecutive entries in the mark stack, a first entry representing the parent object reference and a second entry representing the child object reference, the child object reference comprises a location of a reference of the parent object that has not been marked.

10. The device of claim 9, wherein the at least one processor is further configured to:
traverse the mark stack to find a partially marked object reference.

11. The device of claim 10, wherein the at least one processor is further configured to:
steal the child object reference in the second entry by replacing the second entry with a stolen value when a current read of the second entry matches a last read of the second entry.

12. The device of claim 11, wherein an atomic instruction is used to match a stored value of the second entry from the last read with a current value of the second entry from the current read and to replace the second entry with the stolen value.

13. The device of claim 10, wherein the at least one processor is further configured to:
mark the second entry as being stolen when the child object reference lies with an address range of the parent object reference and the child object reference has not changed since a last read of the child object reference.

14. The device of claim 13, wherein an atomic operation is used to mark the second entry as being stolen.

15. A system, comprising:
a plurality of processors;
at least one process, each process having instructions that when executed on a processor allocates objects dynamically; and
a garbage collector having a plurality of garbage collector threads and a plurality of mark stacks,
at least one mark stack including at least one partially-marked object reference, each partially-marked object reference representing objects requiring marking, each partially-marked object reference including a pair of consecutive entries in the mark stack, a first entry of the pair representing a parent object reference and a second entry of the pair representing a child object reference, each mark stack accessible by each garbage collector thread concurrently, the child object reference comprises a location of a reference of the parent object that has not been marked,
each garbage collector thread containing instructions that when executed on a processor removes a partially-marked object reference from any mark stack for the garbage collector thread to mark objects starting from the child object reference.

16. The system of claim 15, the garbage collector thread contains further instructions that when executed on a processor, performs a first read on the parent object reference and a first read on the child object reference to determine that the parent object reference and the child object reference are a partially-marked object reference, and steals the child object reference when a subsequent atomic read on the child object reference matches a stored value of the child object reference.

17. The system of claim 15, the garbage collector thread contains further instructions, that when executed on a processor, performs a first read on the parent object reference and a first read on the child object reference and when an address of the child object reference lies within an address range of the parent object reference, the child object reference is stolen.

18. The system of claim 17, the garbage collector thread steals the child object reference after determining that the child object reference has not been stolen.

19. The system of claim 17, the garbage collector thread contains an atomic instruction, that when executed on a processor, compares a stored value of the child object reference with a current value of the child object reference and when the stored value of the child object reference matches the current value of the child object references, replaces the child object reference with a stolen value.

20. The system of claim 15, wherein the garbage collector threads do not execute on a same processor concurrently.

* * * * *